United States Patent [19]
Bennett et al.

[11] Patent Number: 5,743,810
[45] Date of Patent: Apr. 28, 1998

[54] GOLF CLUB FABRICATION METHOD AND ARTICLE

[75] Inventors: Richard A. Bennett, Smithtown; Robert L. Benoit, Oakdale; Bernard I. Rachowitz; Glenn L. Spacht, both of Lloyd Neck, all of N.Y.

[73] Assignee: TechMatics, Inc., Hauppauge, N.Y.

[21] Appl. No.: 831,586

[22] Filed: Apr. 9, 1997

[51] Int. Cl.$^6$ .................. A63B 53/04; A63B 53/02
[52] U.S. Cl. .................. 473/305; 473/308; 473/316; 473/409
[58] Field of Search .................. 473/305, 306, 473/307, 308, 309, 310, 311, 312, 313, 314, 315, 324, 409; 403/274, 292, 300, 359; 29/505, 515, 516, 517

[56] References Cited

U.S. PATENT DOCUMENTS

| | | | |
|---|---|---|---|
| 1,639,548 | 8/1927 | Barnhart | 473/306 |
| 1,695,291 | 12/1928 | Muller | 473/318 |
| 4,523,872 | 6/1985 | Arena et al. | |
| 4,984,794 | 1/1991 | Pernelle et al. | 473/305 |

Primary Examiner—Sebastiano Passanti
Attorney, Agent, or Firm—Salzman & Levy

[57] ABSTRACT

A new method is disclosed of fabricating the joint between a golf club post and a drive shaft, as is the article fabricated therefrom. The golf club post to which the shaft attaches includes a circumferential recessed contour. The hollow, metal, electrically conductive golf club shaft is placed over the post, and an electric coil is placed around the shaft and post juncture. The electric coil is electrically pulsed, causing the shaft to shrink fit to the contour of the post. The electro-formed, mechanically bonded shaft is now permanently and integrally anchored to the golf club post. In a second embodiment, a non-conductive shaft of carbon fiber, for example, is electromagnetically bonded to the post, using a metallic ring, which is electromagnetically formed around the non-metallic shaft and post. In a third embodiment, the club head post is additionally fitted with at least one vertically disposed groove along the vertical axis of the post. These vertical grooves capture the shaft as it shrinks to the post surface during electromagnetic forming. The electromagnetically formed shaft shrinks into these grooves, and is prevented from rotationally or angularly slipping about the post.

18 Claims, 3 Drawing Sheets

GOLF CLUB FABRICATION METHOD AND ARTICLE

FIELD OF THE INVENTION

The present invention relates to methods of fabricating golf clubs and, more particularly, to a new method of attaching a shaft to a club head of a golf club, and the article fabricated therefrom.

BACKGROUND OF THE INVENTION

The attachment of a golf club head to its respective shaft is usually accomplished by the process of adhesive bonding. In many instances, however, the adhesive bond will fail. Adhesives in general tend to weaken with time, and with repeated stressing. Constant impact and swing forces tend to stress and weaken the shaft/head bond. Failure of the bond, therefore, becomes inevitable.

The club head tends to separate from the shaft at the worst possible moment. That is, failure usually occurs during a swing, when maximum separation forces are present. At the moment of separation, the club head will fly off the shaft and become an unguided missile. Therefore, inadequate methods of adhesively bonding a club head to its respective shaft create potential hazards.

Often, reinforcing threads are wound about the shaft at the adhesive juncture. Unfortunately, these reinforcing threads also tend to wear and fray with time. Such reinforcement provides little benefit in providing a sound union between the parts.

The present invention provides a strong and permanent bond between the head of a golf club and its respective shaft. The current invention includes a new method of bonding these parts together, such that the bonded juncture between the club head and the shaft will actually be stronger than the parts themselves.

The inventive method of attachment features a step of electromagnetically forming the shaft over a club head post. The general process of electromagnetically forming is well known, and is illustrated in U.S. Pat. No. 4,523,872, issued to Arena et al, on Jun. 18, 1985, for TORSION RESISTANT GROOVED JOINT. The club head post is contoured so that when the shaft is electromagnetically shrunk upon the surface of the contoured post, there will be formed an integrally inseparable union therebetween in the vertical direction.

In addition to forming an inseparable union in the vertical direction, the invention also features means by which angular or rotational slippage of the shaft about the vertical axis of the club head post is prevented.

During impact with a golf ball, the club head tends to recoil, thus causing rotative forces about the club head post and shaft joint. The invention provides at least one vertical groove to be disposed along a portion of the axis length of the club head post. These vertical grooves capture the shaft as it shrinks to the post surface during electromagnetic forming. The electromagnetically formed shaft shrinks into these grooves, and is prevented from rotationally slipping about the post.

SUMMARY OF THE INVENTION

In accordance with the present invention, there is provided a new method of fabricating the joint between the golf club post and the golf club shaft, and the article fabricated therefrom. The golf club post to which the shaft attaches comprises a circumferential recessed contour. The hollow, metal, electrically conductive golf club shaft is placed over the post, and an electric coil is placed around the shaft and post juncture. The electric coil is electrically pulsed, causing the shaft to shrink fit to the contour of the post. The electro-formed, mechanically bonded shaft is now permanently and integrally anchored to the golf club post.

In a second embodiment, a non-conducting shaft of carbon fiber, for example, is electromagnetically bonded to the post, using an electrically conductive metallic ring that is electromagnetically formed around the non-metallic shaft and post.

In a third embodiment, the club head post is additionally fitted with at least one vertically disposed groove along the vertical axis of the post. These vertical grooves capture the shaft as it shrinks to the post surface during electromagnetic forming. The electromagnetically formed shaft shrinks into these grooves, and is prevented from rotationally or angularly slipping about the post.

It is an object of this invention to provide an improved method of attaching a golf club head to its shaft.

It is another object of the invention to provide an integral, mechanically bonded shaft and golf club head post, utilizing an electromagnetical forming process.

It is a further object of this invention to provide a mechanical bond between a golf shaft and golf club head, wherein the joining of the shaft to the golf club head is both vertically and angularly secure.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

Generally speaking, the invention features a method of attaching a golf club head to its respective shaft. The method mechanically bonds the club head to the shaft by means of an electromagnetically forming process. The metal shaft is deformed and shrunk upon a recessed contour disposed upon the non-metallic club head post. The bond provides an integral and permanent joint between the parts.

Figure 1:
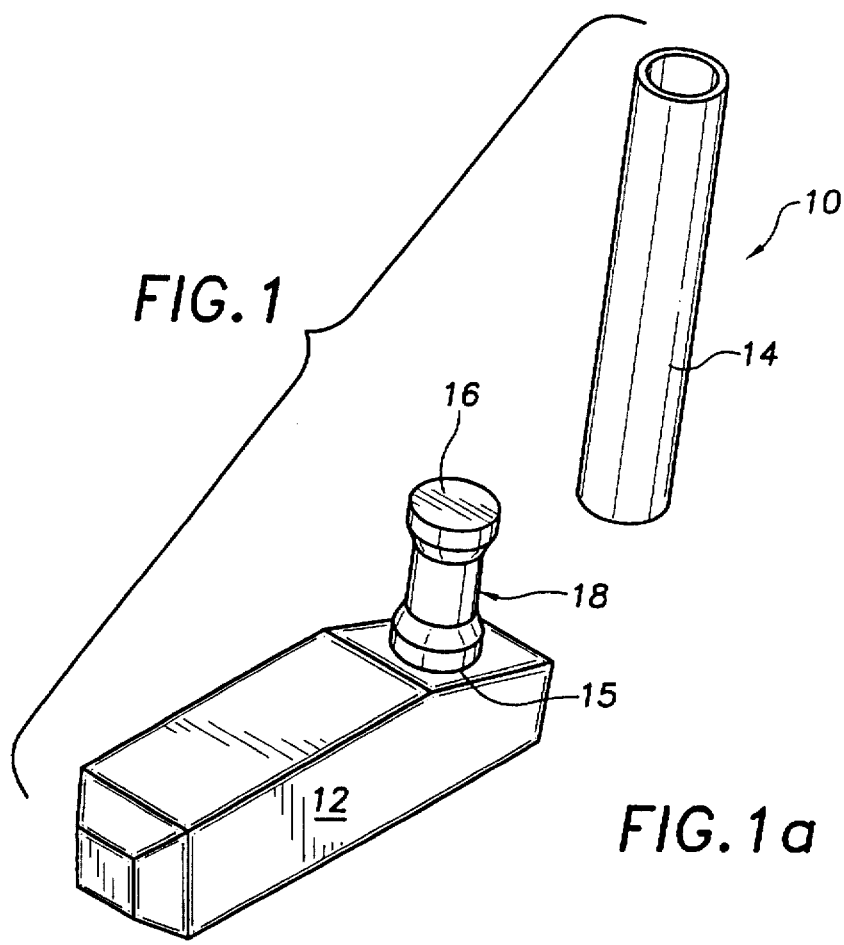
FIG. 1 illustrates a perspective view of a golf club head and shaft in an unassembled state.

Now referring to FIG. 1, an unassembled view of a golf club 10, is illustrated. The golf club 10 comprises a club head 12 and a corresponding metal shaft 14. The post 16 of the club head 12 projects vertically from the base 15 of the club head 12, as shown. The metallic shaft 14 is mechanically bonded to the post 16 by means of an electromagnetic forming process, which is described in the aforementioned U.S. Pat. No. 4,523,872, issued to Arena et al. The electromagnetic forming process comprises placing an electrical coil around the parts to be joined, and then pulsing the coil with a high voltage. A magnetic field is produced in the metal part, causing it to deform about the mating part.

Figure 1A:
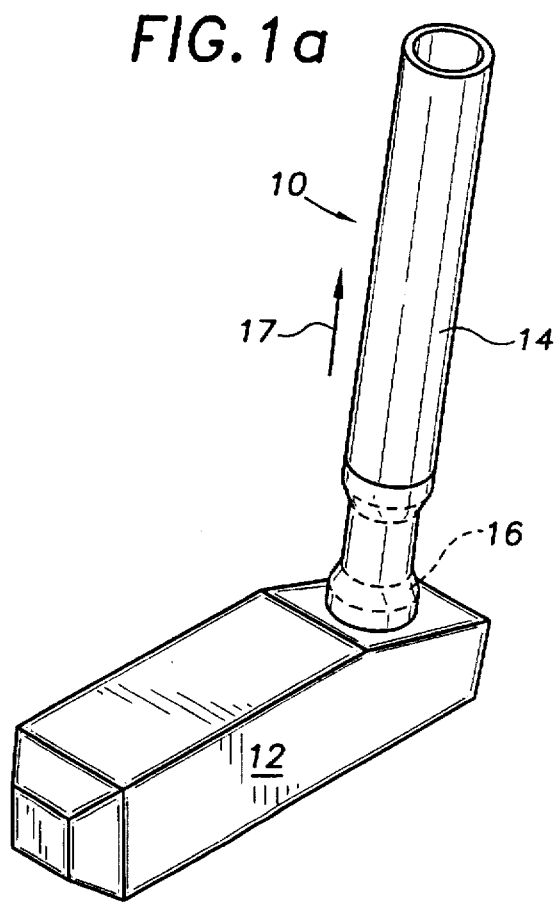
FIG. 1a depicts a perspective view of the golf club head and shaft, shown in FIG. 1, after assembly in accordance with the method of this invention.

The club head post 16 is circumferentially contoured, as shown by arrow 18. The contour or recessed groove 18, is provided so that the shaft 14 will deform into this hollow space during electromagnetic forming. The shrunken shaft 14 will form a high strength mechanical bond with the post 16, creating an integrally inseparable union therebetween in the vertical direction (arrow 17), as illustrated in FIG. 1a. The vertical direction, arrow 17, is along the vertical axis Y—Y (FIG. 3).

Figure 2:
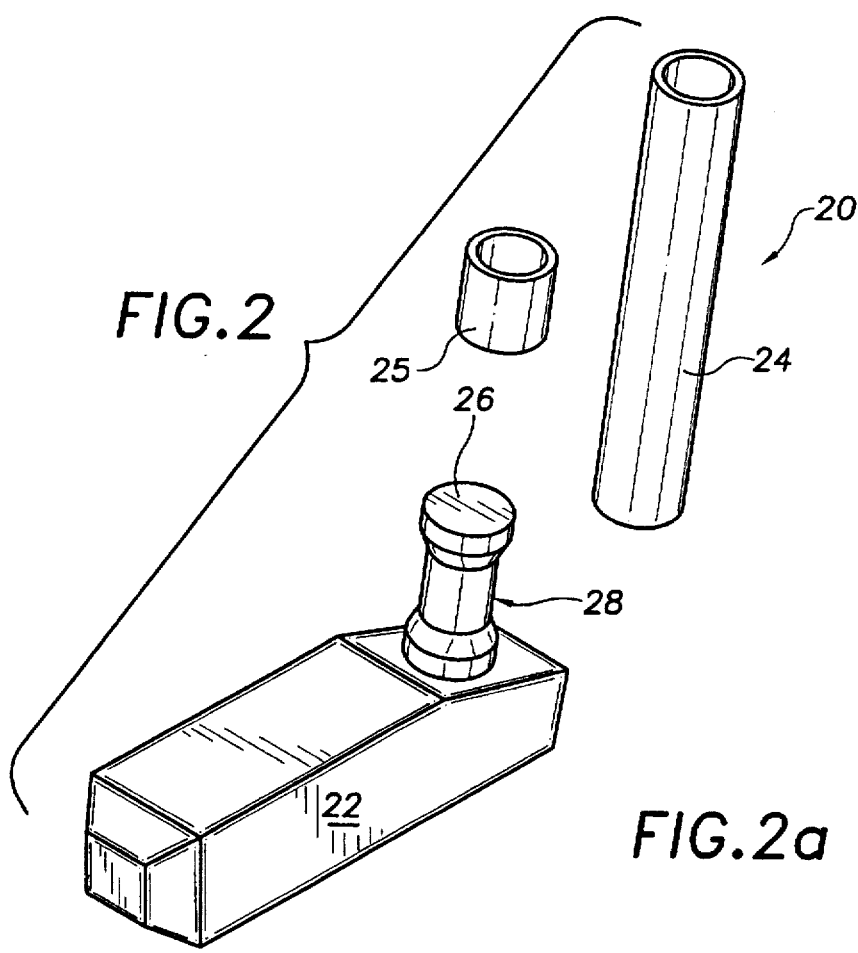
FIG. 2 shows a perspective view of a second embodiment of golf club head, shaft, and driver ring in an unassembled state.
Figure 2A:
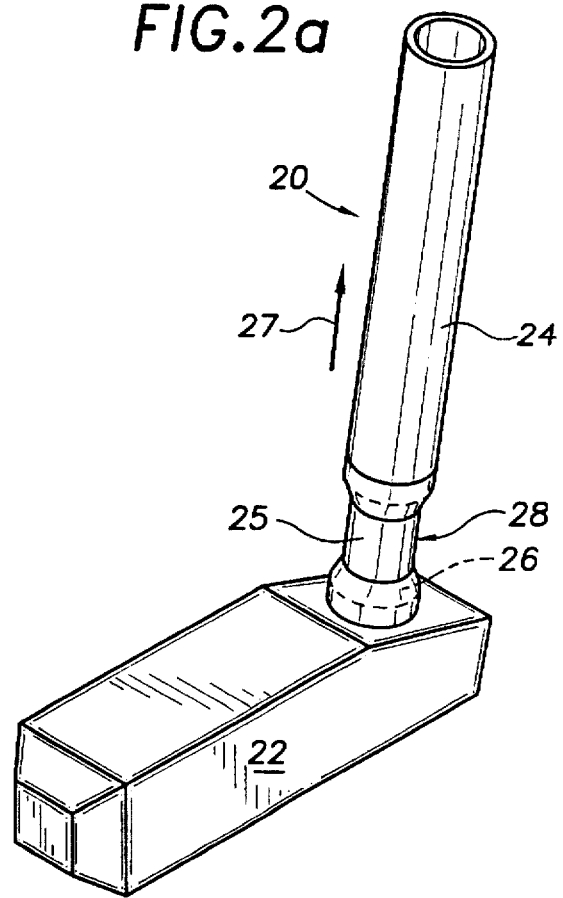
FIG. 2a illustrates a perspective view of the golf club head, shaft, and driver ring depicted in FIG. 2, after assembly in accordance with the method of the invention.

Referring to FIG. 2, a second embodiment is shown for the process depicted in FIGS. 1 and 1a. An unassembled golf club 20, is shown. The golf club 20 is fabricated with a non-conducting shaft 24 (e.g., a carbon-fiber shaft), or an electrically non-conductive metal shaft (e.g., a stainless steel shaft). In order to form a mechanical bond between the non-conducting shaft 24 and the club head post 26 of the club head 22 using the electromagnetic forming process, it is necessary to use a driver ring 25. The driver ring 25 comprises an electrically conductive metallic material. The shaft 24 is placed over the post 26 as before, and the metallic driver ring 25 is placed over the non-metallic shaft 24, adjacent the circumferential recess 28. The electromagnetic forming process will shrink the driver ring 25, thus capturing the shaft 24 and the post 26 to form a mechanical bond therebetween, as illustrated in the assembled view of the golf club 20 (FIG. 2a). The mechanical bond will provide an inseparable union in the vertical direction depicted, arrow 27, along the vertical axis of the shaft 24.

Figure 3:
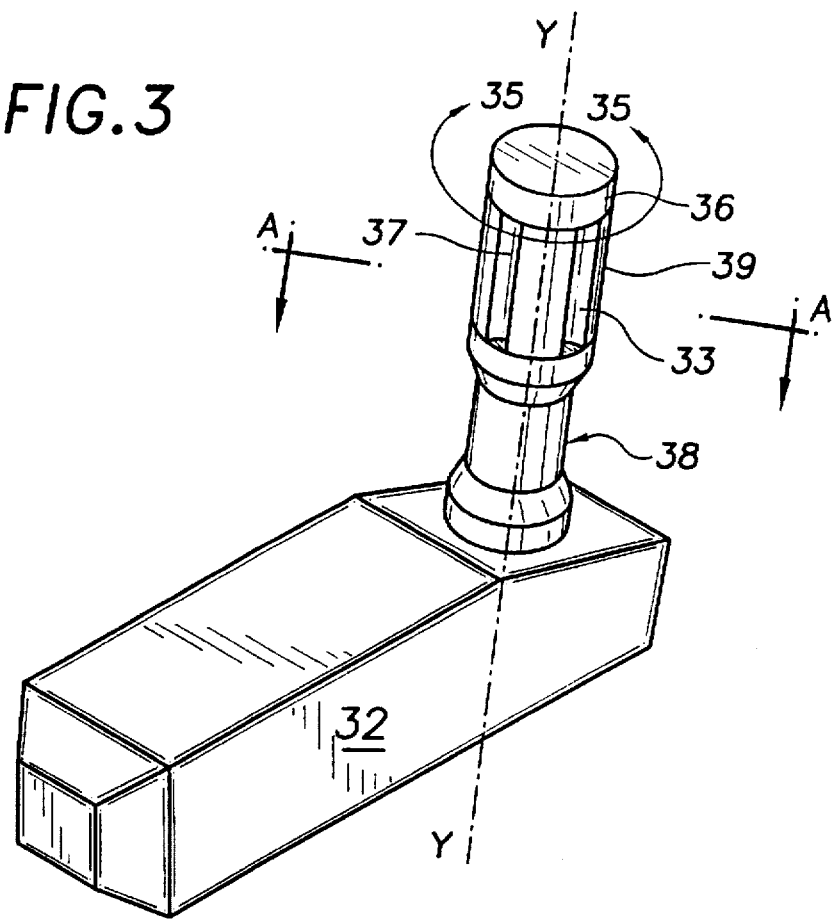
FIG. 3 depicts a perspective view of the golf club head in accordance with a third embodiment of this invention.
Figure 3A:
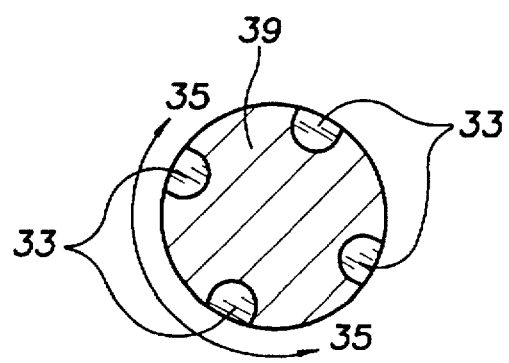
FIG. 3a shows a sectional view of the post of the golf club head illustrated in FIG. 3, as viewed along lines A—A.

Referring to FIGS. 3 and 3a, a third embodiment of the invention is shown. In this embodiment, the post 36 projecting from the golf club head 32 is lengthened to include a vertical section 39 disposed above the circumferential recess 38. The vertical section 39 comprises at least one vertically oriented groove 33, which is shown in more detail in the sectional FIG. 3a. The purpose of the vertical grooves 33 is to capture the shaft, and prevent angular, or rotational movement about the vertical axis of the post 36 and shaft (not shown), defined by line Y—Y.

In this embodiment, the bond between the shaft and the club head post 36 is inseparable in both the vertical direction, arrow 37, and the rotative direction, arrows 35.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method of bonding a golf club head to its respective shaft, comprising the steps of:
   a) placing a golf club shaft that comprises an electrically conductive material over a post of a golf club head said post comprising an electrically non-conductive material, said post including means defining at least one recess disposed therein;
   b) placing an electrical coil about said golf club shaft and said post adjacent said recess; and
   c) applying electricity to said electrical coil so that a mechanical bond is formed between said golf club shaft and said post of said golf club head by a process of electromagnetic forming.

2. The method of bonding a golf club head to its respective shaft in accordance with claim 1, wherein said at least one recess includes a substantially circumferentially disposed groove in said post.

3. The method of bonding a golf club head to its respective shaft in accordance with claim 1, wherein said at least one recess includes a plurality of grooves disposed substantially longitudinally along said post.

4. The method of bonding a golf club head to its respective shaft in accordance with claim 2, wherein said at least one recess includes a plurality of grooves disposed substantially longitudinally along said post.

5. The method of bonding a golf club head to its respective shaft in accordance with claim 1, wherein said electricity applying step (c) includes electrically pulsing said electrical coil.

6. A method of bonding a golf club head to its respective shaft, comprising the steps of:
   a) placing a golf club shaft that comprises an eletrically non-conductive material over a post of a golf club head, said post including means defining at least one recess disposed therein;
   b) placing an electrically conductive ring about said golf club shaft adjacent said at least one recess;
   c) placing an electrical coil about said electrically conductive ring, said golf club shaft, and said post adjacent said recess; and
   d) applying electricity to said electrical coil so that a mechanical bond is formed between said golf club shaft and said post of said golf club head by a process of electromagnetic forming.

7. The method of bonding a golf club head to its respective shaft in accordance with claim 6, wherein said at least one recess includes a substantially circumferentially disposed groove in said post.

8. The method of bonding a golf club head to its respective shaft in accordance with claim 6, wherein said at least one recess includes at least one substantially vertically disposed groove in said post.

9. The method of bonding a golf club head to its respective shaft in accordance with claim 7, wherein said at least one recess includes at least one substantially vertically disposed groove in said post.

10. The method of bonding a golf club head to its respective shaft in accordance with claim 6, wherein said electricity applying step (c) includes electrically pulsing said electrical coil.

11. A golf club, comprising a golf club head having a post that comprises an electrically non-conductive material projecting therefrom in a substantially vertical direction, said post having at least one groove disposed therein, and a shaft that comprises electrically conductive material disposed over said post about said at least one groove, said electrically conductive shaft being electromagnetically formed about said post to form a substantially inseparable bond therebetween.

12. The golf club in accordance with claim 11, wherein said at least one groove is substantially circumferentially disposed.

13. The golf club in accordance with claim 11, wherein said at least one groove is substantially vertically disposed.

14. The golf club in accordance with claim 11, wherein said at least one groove is substantially vertically and substantially circumferentially disposed.

15. A golf club, comprising a golf club head having a post that comprises an eletrically non-conductive material projecting therefrom in a substantially vertical direction, said post having at least one groove disposed therein, a shaft that comprises an eletrically non-conductive material disposed over said non-conductive post about said at least one groove, and a ring that comprises an eletrically conductive material disposed about said electrically non-conductive post and said electrically non-conductive shaft adjacent said at least one groove, said electrically conductive ring being electromagnetically formed about said electrically non-conductive post and said electrically non-conductive shaft to form a substantially inseparable bond therebetween.

16. The golf club in accordance with claim 15, wherein said at least one groove is substantially circumferentially disposed.

17. The golf club in accordance with claim 15, wherein said at least one groove is substantially vertically disposed.

18. The golf club in accordance with claim 15, wherein said at least one groove is substantially vertically disposed and substantially circumferentially disposed.

* * * * *